United States Patent [19]

Inaba

[11] Patent Number: 4,732,414

[45] Date of Patent: Mar. 22, 1988

[54] JOINT FOR COAXIAL PIPE

[76] Inventor: Junio Inaba, 9-49, Ohnodai 1-chome, Sagamihara-shi, Kanagawa, Japan

[21] Appl. No.: 15,414

[22] Filed: Feb. 17, 1987

[30] Foreign Application Priority Data

Nov. 18, 1986 [JP] Japan .................................. 61-274887

[51] Int. Cl.$^4$ ............................................ F16L 47/00
[52] U.S. Cl. .................................. 285/133.1; 285/353; 285/917
[58] Field of Search ................... 285/133.1, 137.1, 917, 285/328, 353, 138

[56] References Cited

U.S. PATENT DOCUMENTS

| | | | |
|---|---|---|---|
| 2,050,137 | 8/1936 | Walsh | 285/917 X |
| 3,503,634 | 3/1970 | Cadiou | 285/353 X |
| 3,521,910 | 7/1970 | Callahan et al. | 285/328 X |
| 3,617,075 | 11/1971 | Van Horn | 285/917 X |

FOREIGN PATENT DOCUMENTS

2038972 7/1980 United Kingdom ................ 285/917

Primary Examiner—Dave W. Arola
Attorney, Agent, or Firm—Cushman, Darby & Cushman

[57] ABSTRACT

A joint for connecting first and second co-axial pipes each having inner and outer pipes with a male joint portion receiving the pipes of one co-axial pipe and a female joint portion receiving the pipes of the other co-axial pipe. The end surfaces of the two portions have opposed protrusions which sealing engage a metallic packing.

3 Claims, 8 Drawing Figures

JOINT FOR COAXIAL PIPE

BACKGROUND OF THE INVENTION

1. Field of the Invention

The present invention relates to a joint for connecting coaxial pipes together and, more particularly, it relates to a joint for connecting coaxial pipes which if so arranged that a plurality of pipes of one of the coaxial pipes can be simultaneously connected with corresponding pipes of the other of the coaxial pipes, respectively, and the respective ones of the connected portions can be sealed by a single packing.

2. Description of the Prior Art

Heretofore, a construction for connecting one pipe to another pipe has been widely used and various joints for connecting the pipes have been developed and carried into practical use. Furthermore, some constructions have been practically used to connect coaxial pipes together. The coaxial pipe has been employed with various purposes. With reference to a double pipe including an inner pipe and an outer pipe, for example, it is utilized in the following manners.

(1) It is used to carry a combustible gas, a poisonous gas or other dangerous fluids. In this case, the inner pipe is used to carry the dangerous fluid, while the outer pipe is used as emergency means or leakage prevanting means for preventing the fluid from leaking outside when a leakage of the fluid may occure from the inner pipe owing to a damage thereof or the like.

(2) It is used as a heat exchanger. In this case, fluids at different temperatures are passed through the inner pipe and the outer pipe, so that a heat exchange is effected between these fluids.

(3) It is used to feed a high-temperature fluid. If a piping system in which the double pipe is used requires the provision of a heat insulation, the inner pipe is used to feed the high-temperature fluid, while the outer pipe is evacuated, thereby forming the heat insulation aroud the inner pipe.

In order to form the piping system, a connection has been heretofore employed to connect one double pipe with another double pipe. However there is no satisfactory joint for connecting the double pipes together and, in fact, it has been a usual practice to form the connection by firstly connecting the inner pipes of the one and the other double pipes by means of a single joint, fitting the outer pipes onto these inner pipes at a construction field and then connecting these outer pipes by welding or binding together.

O-rings are arranged at the connected portions of the inner and outer pipes of these double pipes to form seals between the respective double pipes and between the outer pipes and atmosphere.

We made investigation into the joints for the double pipes and found that the conventional joints have many problems to be solved.

It is firstly noted that in case where lengths of the pipes as prepared are not fit to a piping system to be constructed or in case where a welding of the pipes is not allowed owing to danger of fire, it is impossible to construct the piping system.

Secondly, the conventional construction requires the steps of connecting the inner pipes and the outer pipes, separately, and arranging the packings at the connected portions of the inner and outer pipes, respectively. Accordingly, even if the piping system was arranged as required, the attaching and detaching of the pipes involve many troubles.

Furthermore, the sealing is made by arranging the separate packings at the connected portions of the inner and outer pipes, respectively, and the respective packings are subjected to deterioration at different rates from each other, owing to difference in durability of the respective packings, quality of the fluid and the other conditions. Accordingly, it is required to separately manage the sealed states of the respective connected portions of the inner and outer pipes, that is a troublesome job in actual the actual operation.

OBJECT OF THE INVENTION

It is an object of the present invention to provide a joint for connecting coaxial pipes in which the respective pipes of the one and the other coaxial pipes can be simultaneously and easily connected together and the sealing of the connected portions of the respective pipes can be simultaneously and easily made in reliable manner.

SUMMARY OF THE INVENTION

In order to solve the problems of the prior art as described above, the present invention provides a joint for connecting coaxial pipes, which includes one joint portion 2 attached to an end 4' of one of the coaxial pipes 4 and another joint portion 3 attached to an end 5' of the other coaxial pipes 5; said joint portions 2 and 3 having fluid passages 2a, 2b and 3a, 3b, respectively, which communicate with fluid passages 4a, 4b, 5a, 5b of the one and the other coaxial pipes 4 and 5 to which said joint portions are attached, respectively, said one and another joint portions 2, 3, being detachably connected together so that the fluid passages 2a, 2b of the one joint portion 2 communicate with the corresponding fluid passages 3a, 3b of the other joint portion 3, respectively, sealing means being arranged at a boundary x between said one and the other joint portions, characterized in that said sealing means is constituted by a single flat packing 25 made of metallic material having fluid passages 25a, 25b formed therein to communicate the fluid passages 2a, 2b of the one joint portion 2 with the corresponding fluid passages 3a, 3b of the other joint portion 3, respectively, and annular projections 9, 10, 19, 20 formed at the end surfaces of said one and the other joint portions 2, 3 held in contact with said metallic packing 25 to surround openings 2a', 2b', 3a', 3b' of the fluid passages of said one and the other joint portions 2, 3.

Now, the reasons why the packing, which constitutes a part of the sealing means, is made of metallic material will be explained.

Firstly, the coaxial pipe can be utilized to effect the heat exchange or the heat insulation by the action of vacuum, as described above. Under high temperature or high pressure conditions, a packing made of synthetic rubber or like material tends to cause or deflection or a flexure, so that it is not durable to use for a long time and a packing made of rubber cannot hold a vacuum exceeding a predetermined limit. Under a ultra-high vacuum exceeding the predetermined limit, the gas tends to pass through the packing or a volatile material contained in the rubber packing tends to evaporate, so that it is impossible to hold such high vacuum.

Secondly, in general the joint portions 2, 3 are made by casting metallic material, on the various reasons, such as easiness in manufacturing and machining of the packing, low cost, high strength, etc. That is, the joint portion is in general made of metallic material. Accordingly, in view of balance of rigidity between the joint and the packing, it is preferrable to make the packing 25 of metallic material or other material which has substantially same rigidity as that of the metallic material.

Thirdly, the packing 25 can be formed into a single float shape and can be formed with fluid passages, thus satisfying the requirement for easiness of processing.

Nextly, the reasons why the annular projections 9, 10, 19, 20, which constitute another part of the sealing means, will be explained.

Firstly, the sealing effect is produced by causing the joint portions 2, 3 and the single flat packing 25 of metallic material into direct contact with each other, so that it is a required to form the end surfaces 8', 16' of the joint portions 2 and 3 and the surfaces of the packing 25 with highly fine surface roughness as far as possible. The provision of the annular projections serves to decrease the contact area therebetween as far as possible, thereby decreasing the problem of fineness of the surfaces of the joint portions and the packing.

Secondly, the annular projections serve to decrease the contact area between the joint portions and the packing 25 which are pressed into contact with each other, thereby increasing the sealing force per unit contact area therebetween.

Thirdly, the annular projections serve to perfectly surround the opening portions 2a', 2b', 3a', 3b' of the fluid passages 2a, 2b, 3a, 3b when the joint portions 2 and 3 are pressed into contact with the packing 25, thereby forming independent and reliable seals between the respecteve fluid passages 2a, 2b, 3a, 3b.

OPERATION

The one joint portion 2 and the other joint portion 3 are pressed and connected together, with the single flat packing 25 of metallic material being interposed therebetween. The respective fluid passages 2a, 2b, 3a, 3b of the one and the other joint portions 2 and 3 are communicated with each other through the fluid passages 25a, 25b formed in said packing. The annular projections 9, 10, 19, 20, which are formed on the end surfaces 8', 16' of the one and the other joint portions 2 and 3 at the sides facing said packing 25, surround the opening portions 2a', 2b', 3a', 3b', and these annular projections serve to surround and seal the corresponding fluid passages 25a, 25b of said packing 25 when the joint portions are pressed and connected together, as described above. Due to the pressed contact as described above, the fluid passages 2a, 2b, 3a, 3b are sealed in completely separated state. At the sealed portion, the pressed contacts of the annular projections 9, 10, 19, 20 relative to the metallic packing 25 produce sealing forces per unit contact area which are considerably higher than the pressing force per unit area of the one and the other joint portions relative to the metallic packing 25. Accordingly, the fluids fed into the coaxial pipe 4 are carried into the coaxial pipe 5 in such manner that the fluid passing the connected inner passages 2a, 3a does not leak into the adjacent outer passages 2b, 3b while the fluid passing through the connected outer passages 2b, 3b does not leak into the adjacent inner passages 2a, 3a. Thus the fluids pass from the passages 2a, 2b of the one joint portion 2, through the passages 25a, 25b formed in the pasking and the fluid passages 3a, 3b of the other joint portion 3 to the passages 5a, 5b of the other coaxial pipe 5, respectively.

BRIEF DESCRIPTION OF THE DRAWINGS

FIGS. 1-3 illustrate a first embodiment of the joint according to the present invention, in which:

FIGS. 4A-C illustrate a second embodiment of the joint according to the present invention, in which:

DESCRIPTION OF THE PREFERRED EMBODIMENTS

Now the invention will be described with reference to the preferred embodiments of the invention as shown in the drawings.

Figure 1:
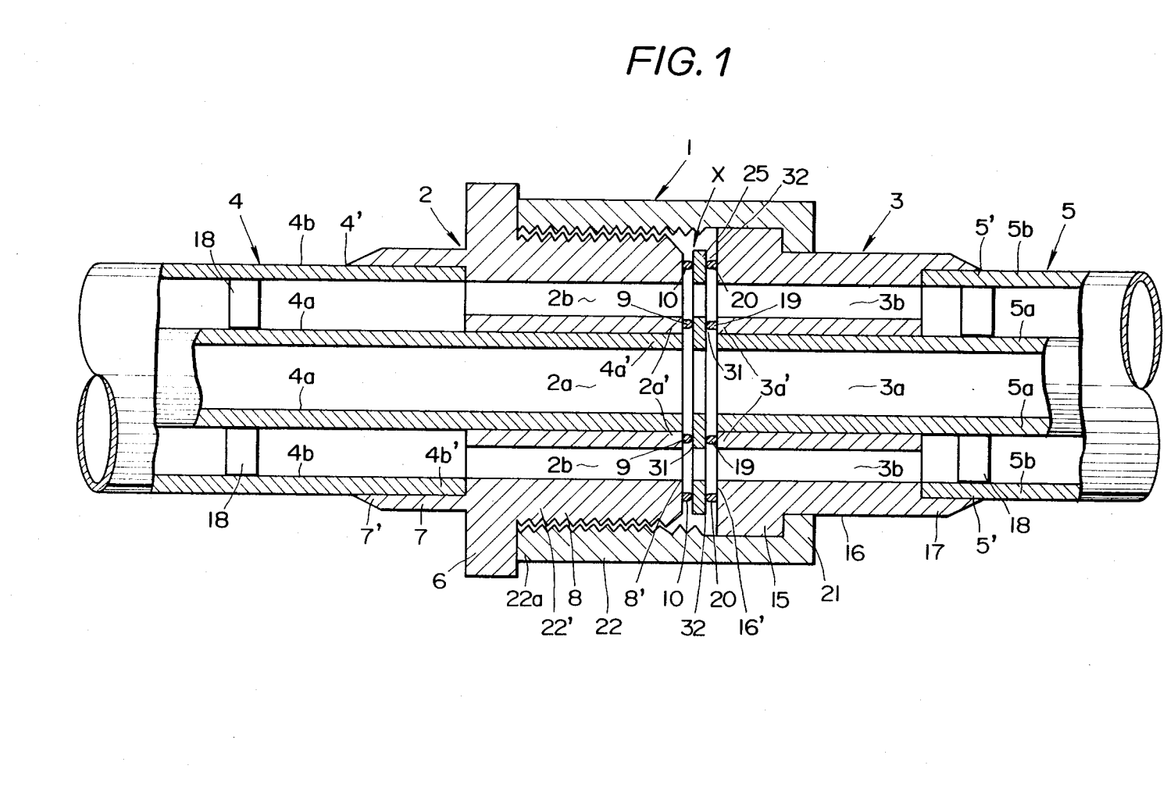
Figure 2:
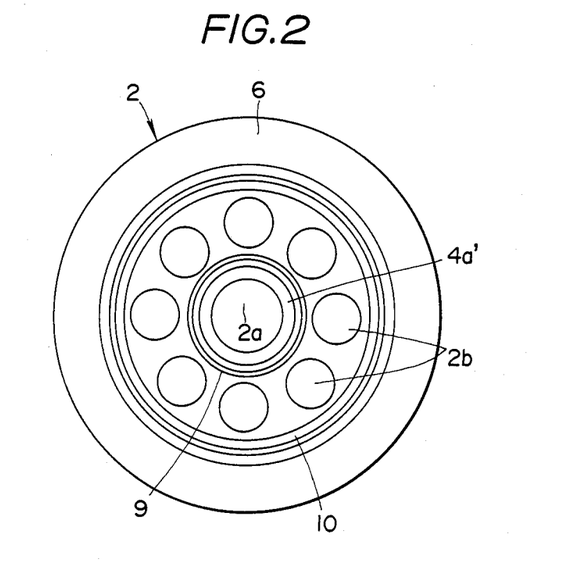
FIG. 2 is a front view of one of the joint portions shown in FIG. 1.
Figure 3:
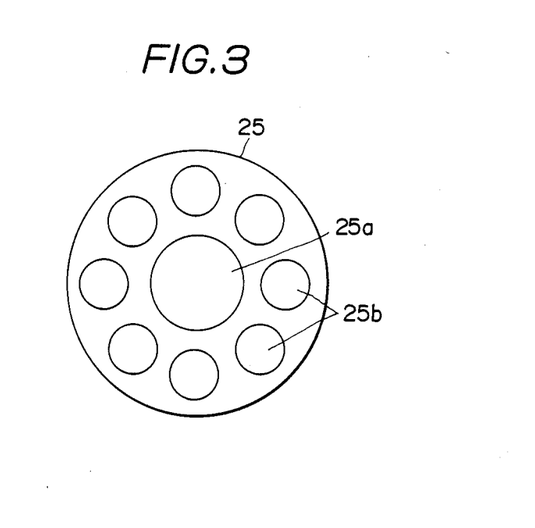
FIG. 3 is a front view of the metallic packing shown in FIG. 1.

FIGS. 1-3 illustrate a first embodiment of the present invention, in which the invention is particularly applied to the joint for connecting double pipes, as an example. Referring to FIG. 1, a joint body 1 for connecting the double pipes consists of one joint portion, a male joint portion, 2 and another joint portion, a female joint portion 3. The male portion 2 includes a cylindrical body 7 and a bored body 8 integrally formed with said cylindrical body. The bored body 8 has a screw thread formed on its peripheral surface and flange 6 integrally connected therewith. The bored body 8 has an inner passage 2a at its center and a plurality of outer passages 26 arranged concentrically around said inner passage at equal distances.

Said bored body 8 is formed at its end surface 8' with an annular projection 9 surrounding an opening and 2a' of the inner passage 2a and an annular projection 10 surrounding all of the plurality of outer passages 2b.

The one joint portion, male joint portion, 2 is connected to an end 4' of the one double pipe 4. The connection is preferrably made by inserting the inner pipe 4a into the inner passage 2a of the male joint portion 2, welding the end 4a' of the inner pipe 4a to the opening end 2a' of the inner passage 2a, and then welding the end 7' of the cylindrical body 7 of said male joint portion 2 to the outside peripheral surface of the end 4b' of the outer pipe 4b of the one double pipe. Thus, the inner pipe 4a and the outer pipe 4b of the one double pipe 4 are communicated with the inner passage 2a and the outer passage 2b of the male joint portions 2, respectively.

The other joint portion, female joint portion, 3 includes a bored body 16 having a flauge 15 formed at its end and a cylindrical body 17 integrally connected to said bored body 16. The bored body 16 has an inner passage 3a at its center and a plurality of outer passages 3b concentrically arranged around said inner passage at equal distances, in the same manner as in the male joint portion. The bored body 16 is formed, at its end surface 16' at the side of said flange 15, with an annular projection 19 surrounding an opening and 3a' of said inner passage 3a and another annular projection 20 surrounding all of the plurality of outer passages 3b. Said other joint portion, female joint portion, 3 is connected to an end 5' of said other double pipe 5. The connection may be made in the same manner as in the case of said male joint portion. The one double pipe as well as the other double pipe includes spacers 18 for holding spaces between the inner pipe 4a, 5a and the other pipe 4b, 5b, so that proper spaces are held between the inner and outer pipes even if the pipe is bent.

In order to connect the one and the other double pipes 4 and 5 together, said male joint portion 2 and said female portion 3 are so positioned that their annular projections 9, 10 and 19, 20 face each other, and these joint portions are pressed and connected with each other. The pressed connection is preferrably made by providing a threading member 22 having an inside flange 21 arranged to be engaged with the flange 15 of the female joint portion 3 and a screw thread formed on its inside wall, and threading said member 22 onto the male joint portion 2 until the forward end 22a of the threading member 22 comes into contact with the flange 6 of the male joint portion 2.

When the male joint portion 2 is connected wtih the female joint portion 3 a single flat packing 25 made of metallic material is interposed therebetween at their boundary x. The metallic packing 25 has a plurality of passages as shown in FIG. 3. That is, the packing 25 has an inner passage 25a arranged to communicate the inner passage 2a, 3a of the one and the other joint portions 2, 3 with each other, and a plurality of outer passages 25b concentrically arranged around said inner passage to communicate the outer pipes 2b, 3b of the one and the other joint portions with each other. Now, the operation will be explained.

The inner annular projections 9, 10 formed on the end surfaces 8', 16' of the male and female joint portions 2 are pressed and sealed to the metallic packing 25 in such manner that those projections surround opening portions 25a', 25a' at both sides of the inner passage 25 of the metallic packing 25, while the outer annular projections 19, 20 are pressed and sealed to the metallic packing 25 in such manner that these projections surround all of opening portions 25b' of the plurality of outer passages 25b at both sides of the metallic packing. Accordingly, the part 31 between the communicated inner passages 9, 19 and the communicated outer passages 10, 20 is sealed, while the part 32 between the outer passages and the atmosphere is also sealed, that is, the inner passages 9, 19 and the outer passages 10, 20 are independently sealed by the single packing 25.

The single flat packing 25 arranged at right angle to the inner and outer passages 2a, 2b, 3a, 3b, which is made of metallic material, is resilient to the action of temperature and pressure, so that it does not produce deformation even if a fluid is fed at high temperature at a high pressure, and its air tight property is not adversely affected even if the pipe is held in evacusted state.

Thus the sealing effect is assured by the metallic packing 25 and the inner and outer annular projections 9, 10, 19, 20. At the sealed parts 31, 32, the contact area is decreased, so that the sealing force per unit contact area is increased. Accordingly, the inner and outer passages are reliably and properly sealed, whereby the leakage of the fluid at the connected portions is completely avoided.

Figure 4A:
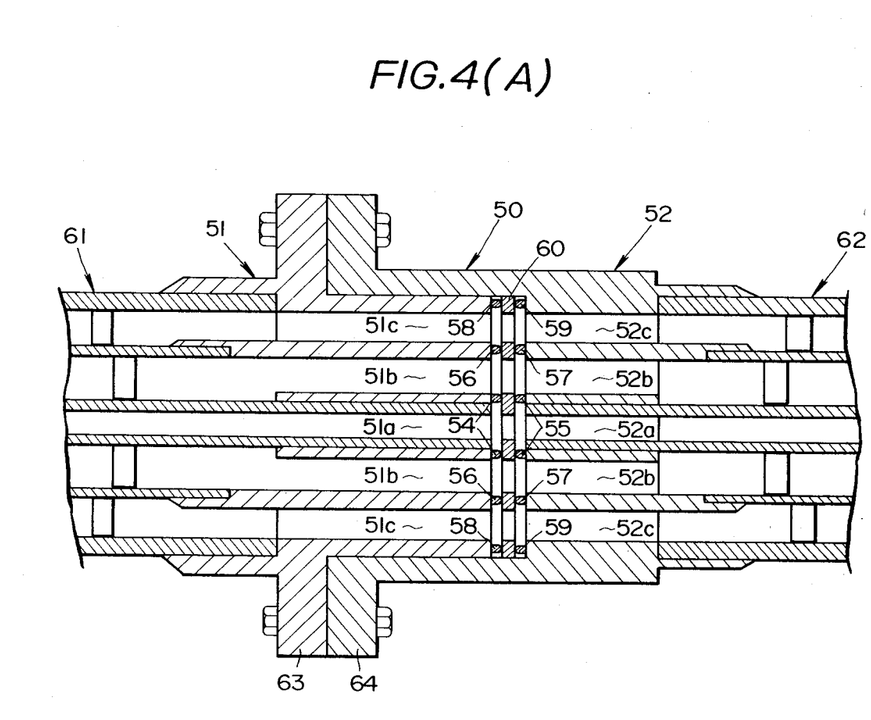
FIG. 4A is a sectional view of the joint body.
Figure 4B:
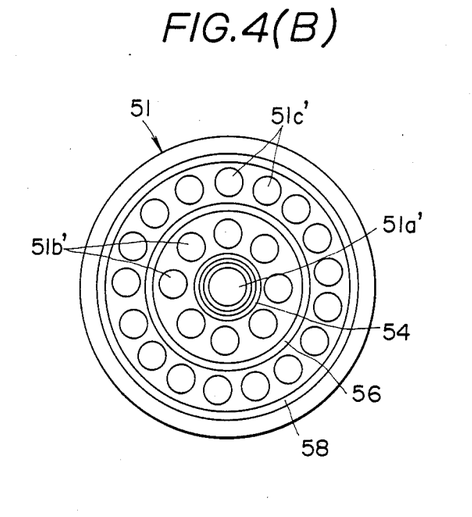
FIG. 4B is a front view of one of the joint portions shown in FIG. 4A.
Figure 4C:
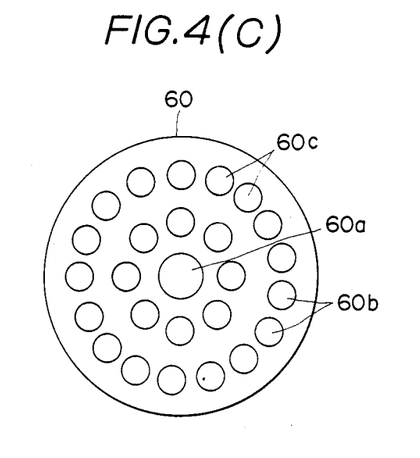
FIG. 4C is a front view of the metallic packing shown in FIG. 4A.

FIGS. 4A-C illustrate a second embodiment, in which the invention is applied to a joint for connecting triple pipes.

In FIG. 4, a joint body 50 for connecting triple pipes includes a male joint portion 51 and a female joint portion 52, as in the first embodiment. In the second embodiment, each of the one and the other joint portions 51, 52 includes three passages for connecting the triple pipes 51, 52. As shown is FIG. 4B, the one joint portion 51 has an inner passage 51a at its center, a plurality of outer passages 51c concentrically arranged around said inner passage 51c and a plurality of intermediate passages 51b concentrically arranged betweens said inner passage and said outer passages. The other joint portion, female joint portion, 52 also includes three passages 52a 52b, 52c.

The one and the other joing portions 51, 52 are formed, at their end surfaces, with inner annular projection 54, 55 surrounding opening portions 51a' 52a' of the inner passages 51a, 52a, intermediate annular projections 56, 57 surrounding all of opening portions 51b', 52b' of the intermediate passages 51b, 52b, and outer annular projections 58, 59 surrounding opening portions 51c', 52c' of the outer passages 51c, 52c.

A single flat packing 60 disposed at the boundary of the one and the other joint portions 51, 52 has an inner passages 51a, 52a, the intermediate passages 51b, 52b and the outer passages 51c, 52c, respectively, as shown in FIG. 4C.

In the second embodiment, the male joint portion 51 and the female joint portion 52 are connected together by tightening flanges 63 and 64 of the joint portions 51 and 52 by means of bolt-nut assemblies. In the other points, the second embodiment is similar to the first embodiment.

Figure 5:
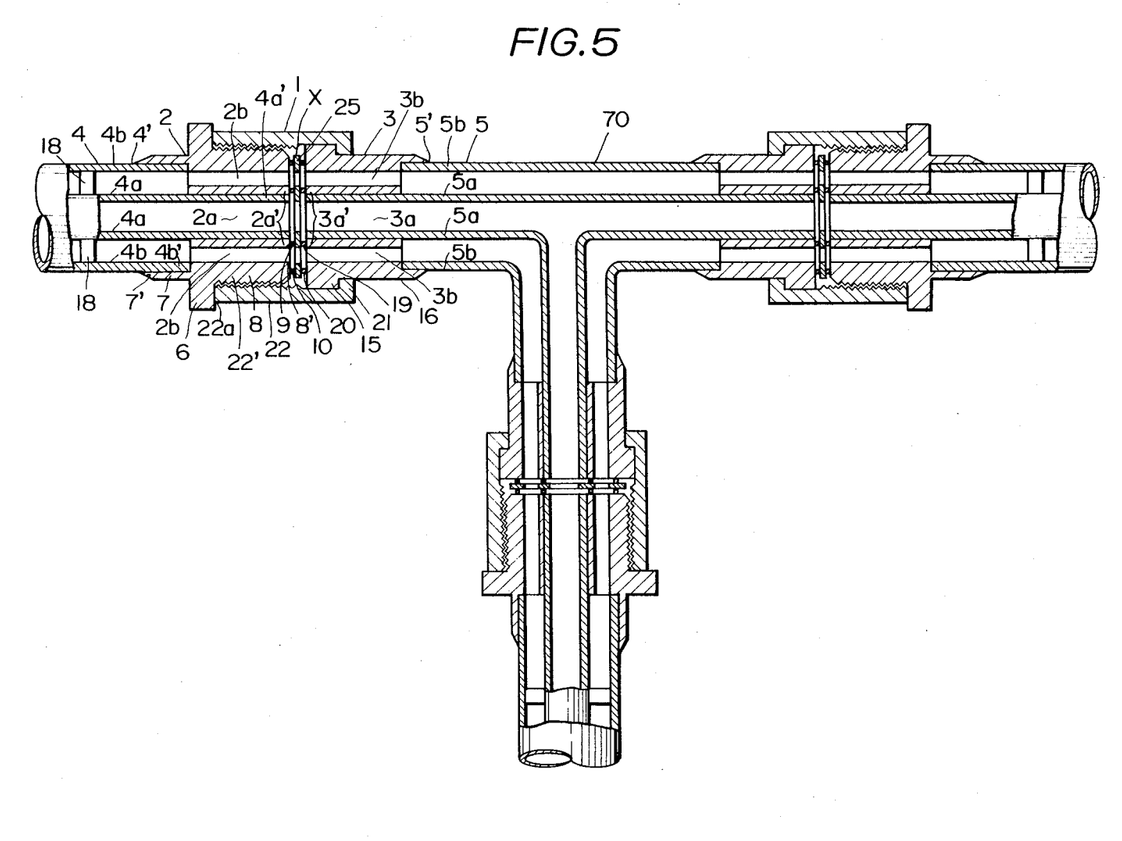
FIGS. 5 and 6 illustrates a third embodiment of the joint according to the present invention, and each is a sectional view showing the three-way joint.
Figure 6:
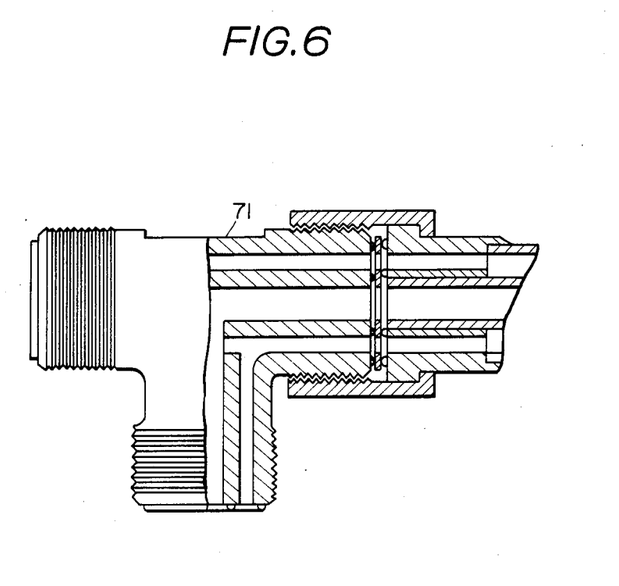

FIGS. 5 and 6 illustrate a third embodiment of the present invention. This embodiment is designed as a three way joint. Each of joints 70 and 71 has three connecting portions to which double pipes are connected. The joint 70 has three female joint portions to which three double pipes are connected. The joint 71 has three male joint portions to which three double pipes are connected. In the other points, the third embodiment is similar to the first embodiment.

TECHNICAL EFFECT OF THE INVENTION

From the above description it will be understood that the present invention provides a joint for connecting coadial pipes which includes one joint portion connected to an end of one of the coaxial pipes and another joint portion connected to an end of the other of the coaxial pipes; said one and the other joint portions having passages which communicate with the passages of the one and the other coaxial pipes, respectively, said one and the other joint portions being detachably connected so that the passages of the one joint portion communicate with the corresponding passages of the other joint portion, respectively, sealing means being disposed at a boundary of said one and the other joint portions, characterized in that said sealing means is constituted by a single flat packing of metallic material having passages for communicating the corresponding passages of said one and the other joint portions with each other, respectively, and annular projections formed on end surfaces of said one and the other joint portions and arranged to surround opening portions of the passages of said one and the other passages of the one and the other joint portions, respectively. According to the constuction as described above, the passages of the one and the other joint portions and the passages of the metallic packing can be completely surrounded by the annular projections and the metallic packing, so that said one and the other coaxial pipes can be communiated in proper and easy manner. By the pressed and sealed connection of the metallic packing with the annular projections, high sealing force per unit contact area can be attained and said high sealing force per unit contact area is completely applied to the parts surrounding the opening portions of the passages, whereby the leakage between the passages can be completely avoided. It is not required to provide a highly fine surface roughness of the end surfaces of the joint portions and the surfaces of the metallic packing and it is possible to provide the joint at low cost.

With regard to the packing, it is possible to seal the respective passages of the single packing and the joint portions simultaneously, without using the separate sealing means by separate packings as in the conventional joint. According to this construction, the number of parts of the joint is decreased and great economy is obtained. Furthermore, the operation of mounting and demounting the joint is effected easily so that the working efficiency is improved. Since only one packing is used, the deterioration of the sealing portions of the packing can be found easily, so that the load required to manage the sealed portions can be decreased as that required in the conventional joint in which a plurality of separate packings are employed. Since the packing is made of metallic material, the packing which is arranged at right angle to the passages can withstand the high temperature and the high pressure of the fluid passing through the passages at the connection between the joint with the coaxial pipes, even when the coaxial pipes are employed as heat exchange means or vacuum heat insulation means. Thus the joint of this invention is very advantageous in utilization in the above fields.

I claim:

1. A joint for connecting first and second co-axial pipes each having inner and outer pipes comprising:
   a male joint portion having an inner portion for receiving an inner pipe of one of said co-axial pipes and having an internal bore communicating with said inner pipe, an outer cylindrical portion for receiving the outer pipe of said one co-axial pipe, a bored body integrally extending from said outer portion, said body defining a plurality of longitudinal bores between said body and said inner portion for communicating with said outer pipe;
   a female joint portion having an inner portion for receiving the inner pipe of the other of said co-axial pipes and having an internal bore communicating with said inner pipe of the other of said co-axial pipes, an outer cylindrical portion for receiving the outer pipe of the other of said co-axial pipes, and a bored body integrally extending from said female joint bored body, said female joint bored body defining a plurality of longitudinal bores between said body and said female joint bored body for communicating with said outer pipe of the other of said co-axial pipes;
   said inner portions of each said male and female joint portions having on an end surface opposing protrusions and said outer portions of each said male and female joint portions having opposing protrusions on the end surface remote from said outer cylindrical surface;
   the bored body of one of said portions having a screw thread on the outer peripheral surface thereof and the bored body of the other portion having an external flange on its peripheral surface;
   a flat metallic packing between said portions and having an inner passage communicating said internal bores of said inner portions and outer passages communicating said longitudinal bores; and
   means engaging said screw thread and said flange for locking said male and female portions together with said packing therebetween so that said opposing protrusions are urged toward each other with said packing therebetween so that said protrusions are pressed and sealed to said packing and said internal bores and longitudinal bores are sealed from each other and the atmosphere.

2. A joint as in claim 1 wherein said male and female joint each includes at least two inner portions, one within the other, so that said joint joins three co-axial pipes.

3. A joint as in claim 1 wherein said female joint includes three joining portions and including three male joint portions for joining together three co-axial pipes in a T.

* * * * *